(12) United States Patent
Mirza (10) Patent No.: US 11,974,166 B2
(45) Date of Patent: Apr. 30, 2024

(54) 5G NEW RADIO (NR) TIME DIVISION DUPLEXING FRAME STRUCTURE MANAGEMENT FOR HEAVY UPLINK TRAFFIC SITE

(71) Applicant: T-Mobile Innovations LLC, Overland Park, KS (US)

(72) Inventor: Mochamad Mirza, Bothell, WA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 0 days.

(21) Appl. No.: 17/741,127

(22) Filed: May 10, 2022

(65) Prior Publication Data

US 2023/0370895 A1    Nov. 16, 2023

(51) Int. Cl.
| | |
|---|---|
| *H04W 36/22* | (2009.01) |
| *H04W 28/086* | (2023.01) |
| *H04W 36/00* | (2009.01) |
| *H04W 72/1268* | (2023.01) |
| *H04L 5/14* | (2006.01) |

(52) U.S. Cl.
CPC . *H04W 28/0861* (2023.05); *H04W 36/00835* (2018.08); *H04W 36/22* (2013.01); *H04W 72/1268* (2013.01); *H04L 5/14* (2013.01)

(58) Field of Classification Search
CPC . H04L 27/2628; H04L 5/0082; H04L 5/0035; H04L 5/0094; H04L 5/14; H04L 5/0051; H04L 5/0007; H04B 7/0626; H04B 7/0417; H04W 28/0861; H04W 36/008835; H04W 36/22
See application file for complete search history.

(56) References Cited

U.S. PATENT DOCUMENTS

| | | | |
|---|---|---|---|
| 2013/0106980 A1* | 5/2013 | Obaidi | H04N 21/43072 348/14.02 |
| 2017/0171840 A1* | 6/2017 | Mukherjee | H04W 16/14 |
| 2019/0245672 A1* | 8/2019 | Fehrenbach | H04L 27/2628 |

* cited by examiner

*Primary Examiner* — Anez C Ebrahim
(74) *Attorney, Agent, or Firm* — Shook, Hardy & Bacon L.L.P.

(57) ABSTRACT

According to aspects herein, methods and systems for time division duplexing (TDD) management in New Radio (NR) are provided. The method begins with determining if a cell site has heavy uplink use. This can be shown by the cell site using a heavy uplink TDD pattern, which is indicative of users transmitting more data then they receive. Once a cell site has been found to have heavy uplink use, a list of neighboring cell sites is retrieved. The neighboring cell sites may be analyzed to determine if they have heavy downlink use. The method then proceeds to determine if the neighboring cell sites with heavy downlink use can be downlink blanked. Downlink blanking on the neighboring cell sites may then be turned on.

15 Claims, 7 Drawing Sheets

5G NEW RADIO (NR) TIME DIVISION DUPLEXING FRAME STRUCTURE MANAGEMENT FOR HEAVY UPLINK TRAFFIC SITE

BACKGROUND

Mobile communications systems can use a time division duplex (TDD) to separate uplink and downlink signals. TDD systems operating in the same frequency range and within the same area, such as on nearby cell sites, need to be synchronized. One advantage of TDD systems is flexibility when there is asymmetry of uplink and downlink data. Based stations in a TDD system need to transmit at the same time periods and all devices transmit in dedicated time periods. In some cases, devices need to transmit more data than they receive, which occurs in heavy uplink applications such as video conferencing, uploading pictures or video, and online gaming. The heavy uplink patterns used in these situations may cause interfere with neighboring cell sites using a heavy downlink pattern. Aspects discussed herein provide methods and apparatus for new radio (NR) TDD in areas with heavy uplink and heavy download TDD.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for time division duplexing (TDD) management in New Radio (NR) are provided. Aspects of the disclosure provide a method for TDD management. The method begins with determining if a cell site has heavy uplink use. This can be shown by the cell site using a heavy uplink TDD pattern, which is indicative of users transmitting more data then they receive. Once a cell site has been found to have heavy uplink use, a list of neighboring cell sites is retrieved. The neighboring cell sites may be analyzed to determine if they have heavy downlink use. The method then proceeds to determine if the neighboring cell sites with heavy downlink use can be downlink blanked. Downlink blanking on the neighboring cell sites may then be turned on.

Further aspects of the disclosure provide computer-readable storage media having computer-executable instructions. The instructions may be embodies on the computer-readable storage media and, when executed by one or more processors, cause the one or more processors to determine if a cell site has heavy uplink use. The processors may also retrieve a list of neighboring cell sites and determine if those neighboring cell sites have heavy downlink use. If the neighboring cell sites have heavy downlink use, the processors will then determine if those neighboring cell sites may be downlink blanked to eliminate the heavy uplink interference. Downlink blanking is then turned on for the duration of the heavy uplink use by the cell site.

Still further aspects of the disclosure provide a system for time division duplex (TDD) management. The system comprises a cell site and multiple neighboring cell sites. A mobile device having heavy uplink use is using the cell site. A network component is configured to communicate with the cell site. In addition, the system includes a processor and one or more computer storage hardware devices storing computer-useable instructions that, when used by the processor, cause the processor to determine if the cell site has heavy uplink use. The instructions also provide for retrieval of a list of neighboring cell sites and also to determine if those neighboring cell sites have heavy downlink use. The neighboring cell sites with heavy downlink use may then have downlink blanking turned on.

The present systems and methods address the shortcomings of using TDD systems in areas with heavy uplink use and the resulting uplink interference. The uplink interference is caused by the lack of coordination of the uplink timing slots with neighboring downlink slots. Aspects of the disclosure provide methods, systems, and computer executable instructions to manage TDD systems.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB or a New Radio (NR) connection). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

A time division duplex (TDD) system uses time division multiplexing to separate uplink and downlink signals. It emulates full duplex communication over a half-duplex communication link. TDD provides flexibility in situations where there is asymmetry of uplink and downlink data rates. As the amount of uplink data increases, more communication capacity can be dynamically allocated, and when the traffic load is lighter, capacity can be decreased. The same concepts also apply to downlink signals.

In a TDD system there is a space or gap occurs between a downlink burst and the subsequent uplink burst. Similarly, there is a similar space or gap between the uplink burst and the subsequent downlink burst. The spaces ensure that the full transmission is sent without interference. TDD systems operating in the same frequency range within the same area need to be synchronized to prevent or reduce interference. Base stations need to transmit at the same time periods and all devices need to transmit in dedicated time periods.

There are areas where devices transmit more data than they receive, typically when using uplink heavy applications. Some applications, such a video conferencing, uploading pictures or video to sites, and online gaming, may require significant uplink data. Base stations may use a heavy uplink TDD pattern, for example, 70% downlink and 30% uplink in high uplink traffic areas, while some base stations in the surrounding area are using a heavy downlink pattern, for example 80% downlink and 20% uplink. The difference in the TDD patterns may cause uplink interference to a problem area.

In accordance with aspects herein, downlink blanking may be used on the low uplink traffic site or base station can eliminate uplink interference on the high uplink traffic site or base station. Using downlink blanking may affect performance on neighboring low uplink traffic sites. A self-organizing network (SON) may be used to dynamically turn on or off the downlink blanking, thus minimizing negative effects.

A SON is an automation technology that may simplify the planning, configuration, management, optimization, and healing of mobile radio access networks easier and faster. SONs may be distributed, centralized, and hybrid. A distributed SON has functions distributed among the network elements at the edge of the network, typically the eNodeB elements. This can provide some localization of functionality. A centralized SON has functions concentrated closer to higher-order network nodes or the network operations support systems. Centralized SONs can provide a broader overview of more edge elements and allow coordination of loads across a wide geographic area. A hybrid SON contains a mix of centralized and distributed SONs.

A SON may provide self-configuration, self-optimization, and self-healing functions. Self-configuration functions allow new base stations to automatically be configured and integrated into the network. Self-optimization functions allow for altering configuration parameters that control various aspects of the cell site or base station. SONs can also establish automatic neighbor relations (ANR) automatically and can also provide lists of neighboring base stations and their configurations.

In accordance with aspects herein, the SON may be used to dynamically turn on or off downlink blanking of neighboring cell sites to minimize uplink interference. A list of cell sites may be obtained from ANR and used to determine which neighboring cell sites may be downlink blanked.

Aspects herein include systems, methods, and computer readable media for New Radio (NR) TDD management of uplink interference using dynamically adjustable downlink blanking of interfering neighboring base stations or cell sites.

In accordance with a first aspect of the present disclosure, a method for time division duplex (TDD) management is provided. The method begins with determining if a cell site has heavy uplink use. This may be determined by examining the TDD pattern in use, a heavy uplink pattern may allot a higher percentage of slots to uplink. The method then retrieves a list of neighboring cell sites and determines if those neighboring cell sites have heavy downlink use. The method then determines if the neighboring cell sites with heavy downlink use can be downlink blanked, and if so, turns on downlink blanking.

A second aspect of the present disclosure is directed to a computer-readable storage media having computer-executable instructions embodied on it, that when executed by one or more processors, cause the one or more processors to: determine if a cell site has heavy uplink use; retrieve a list of neighboring cell sites; determine if the neighboring cell sites have heavy downlink use; determine if the neighboring cell sites with heavy downlink use can be downlink blanked; and turning on downlink blanking on the neighboring cell sites.

Another aspect of the present disclosure is directed to system for TDD management. The system comprises a cell site and multiple neighboring cell sites, as well as a mobile device having heavy uplink use on the cell site. A network component is configured to communicate with the cell site and incorporates engines for managing TDD patterns. The system also includes a processor and one or more computer storage hardware devices storing computer-useable instructions that, when used by the processor, cause the processor to: determine if the cell site has heavy uplink use; retrieve a list of neighboring cell sites; determine if the neighboring cell sites have heavy downlink use; determine if the neighboring cell sites with heavy downlink use can be downlink blanked; and turn on downlink blanking on the neighboring cell sites.

Figure 1:
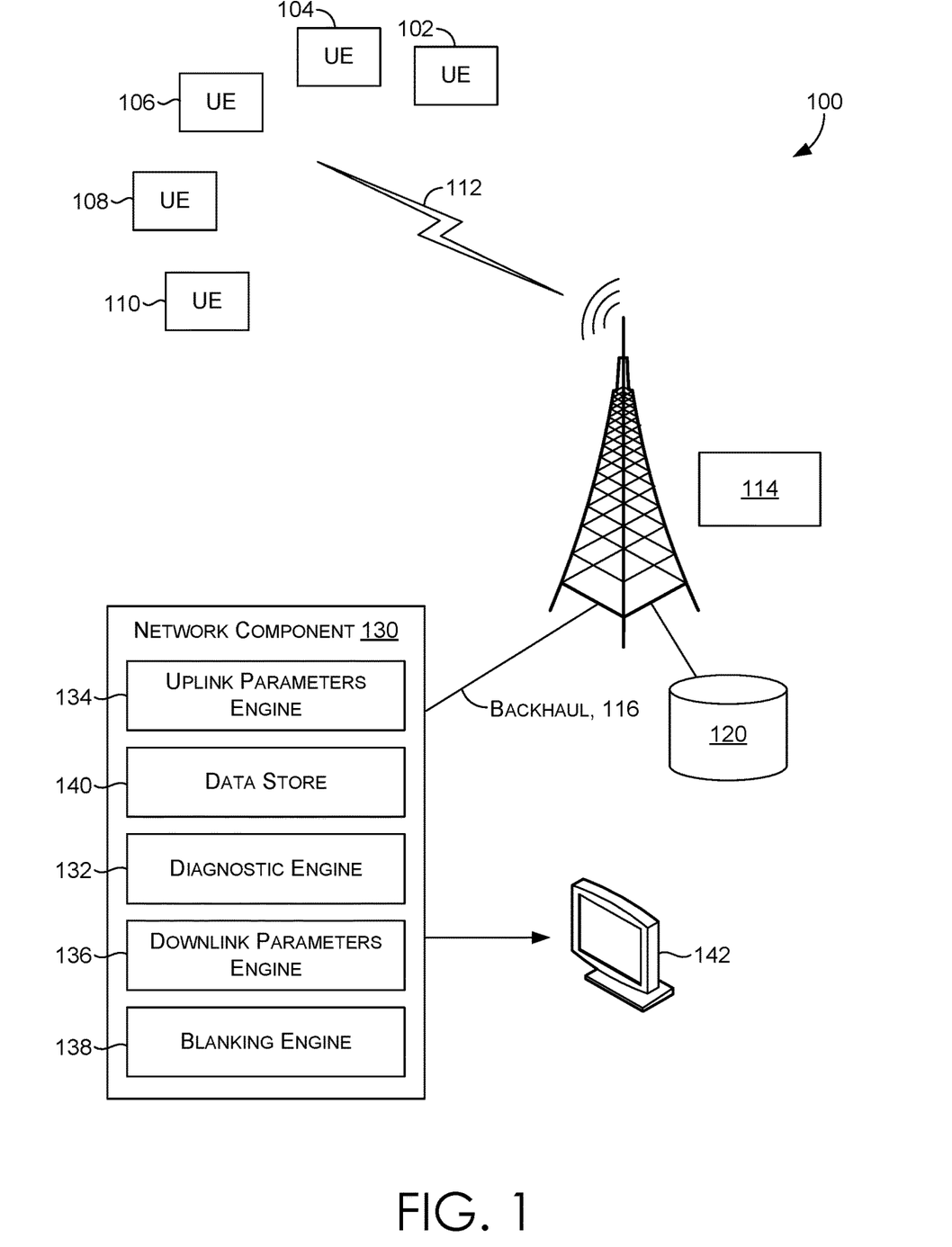
FIG. 1 depicts a computing environment suitable for use in implementations of the present disclosure, in accordance with aspects herein.

FIG. 1 depicts a wireless network environment incorporating a time division duplex (TDD) system in which implementations of the present disclosure may be employed. Such a network environment is illustrated and designated generally as network environment 100. Network environment 100 is not to be interpreted as having any dependency or requirement relating to any one or combination of components illustrated.

Network environment 100 includes user devices (UE) 102, 104, 106, 108, and 110, access point 114 (which may be a cell site, base station, or the like), and one or more communication channels 112. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device) that communicates via wireless communications with the access point 214 in order to interact with a public or private network.

Figure 8:
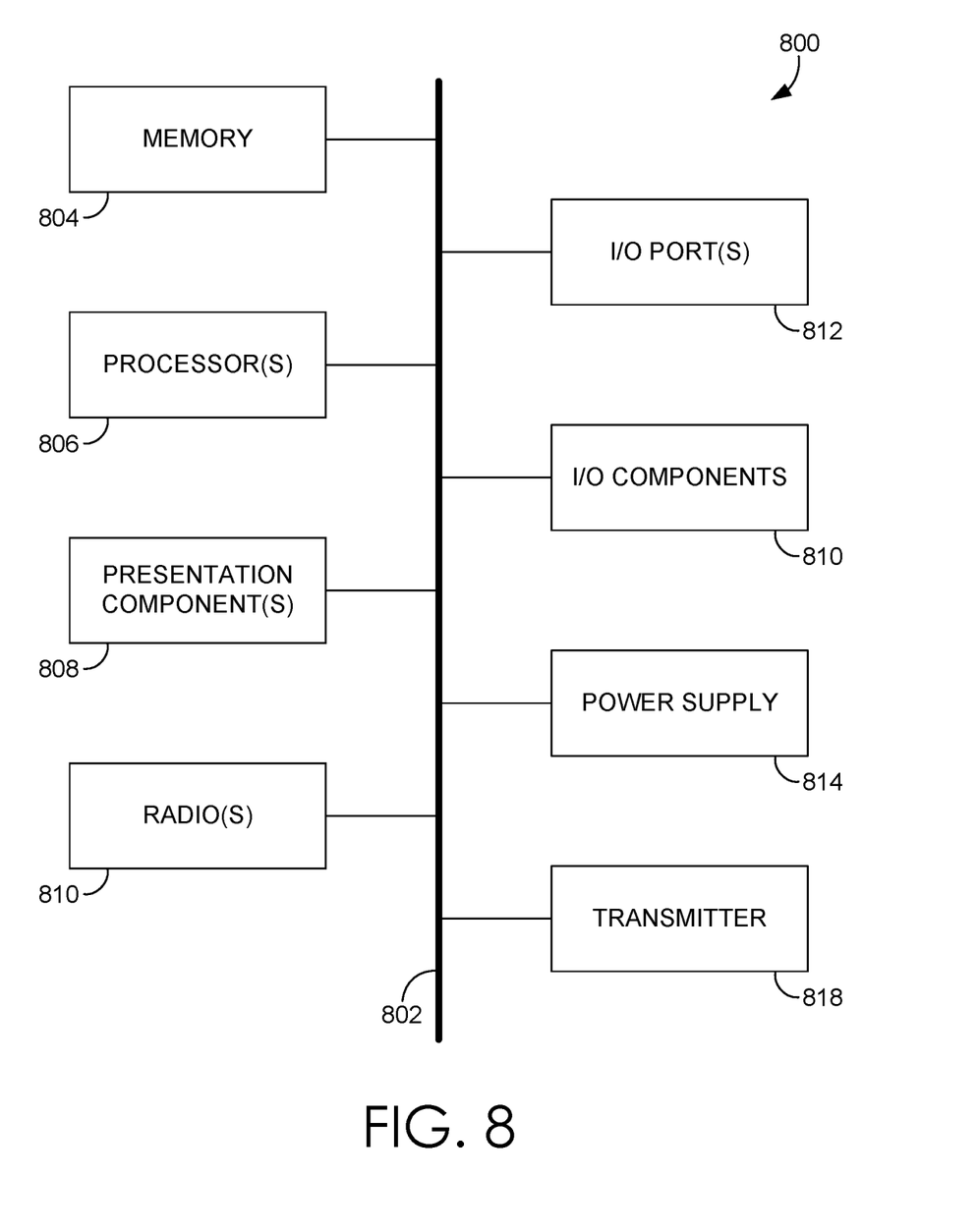
FIG. 8 depicts a diagram of an exemplary network environment in which implementations of the present disclosure may be employed, in accordance with aspects herein.

In some aspects, each of the UEs 102, 104, 106, 108, and 110 may correspond to computing device 800 in FIG. 8. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through access point 114. The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, NR and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 114 is configured to communicate with a UE, such as UEs 102, 104, 106, 108, and 110, that are located within the geographic area, or cell, covered by radio antennas of access point 114. An access point 114 may include one or more base stations, base transmitter stations, radios, antennas, antenna arrays, power amplifiers, transmitters/receivers, digital signal processors, control electronics, GPS equipment, and the like. In particular, access point 114 may selectively communicate with the user devices using dynamic beamforming.

As shown, access point 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the access point 114. Access point 114 may store the data communicated by the UEs 102, 104, 106, 108, and 110 at a network database 120. Alternatively, the access point 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. As described above, the status data collected by the UEs 202, 204, 206, 208, and 210 can include, for example, service state status, the respective UE's current geographic location, a current time, a strength of the wireless signal, available networks, and the like.

The network component 130 comprises various engines including a diagnostics engine 132, an uplink parameters engine 134, a downlink parameters engine 136, a blanking engine 138, and a data store 140. All determinations, calculations, and data further generated by the diagnostics engine 132, the uplink parameters engine 134, the downlink parameters engine 136, and the blanking engine 138 may be stored at the data store 140. Although the network component 130 is shown as a single component comprising the diagnostics engine 132, the uplink parameters engine 134, the downlink parameters engine 136, the blanking engine 138, and the data store 140, it is also contemplated that each of the diagnostics engine 132, the uplink parameters engine 134, the downlink parameters engine 136, the blanking engine 138, and the data store 140 may reside at different locations, be its own separate entity, and the like, within the home network carrier system.

The network component 130 is configured to communicate with the diagnostics engine 132 to determine current network uplink and downlink parameters and adjust uplink and downlink parameters based at least on part on automatic neighbor relations (ANR) and assist in the optimization of self-organizing networks (SON). The uplink parameters engine 134 may store multiple uplink parameters for use in varying uplink conditions. Similarly, the downlink parameters engine 136 may store multiple downlink parameters for use in conjunction with the uplink parameters. Coordination between cell sites or base stations is also provided through network component 130. The blanking engine 138 provides downlink blanking on neighboring base stations with low uplink traffic, thus reducing or eliminating uplink interference. In operation, the uplink parameters engine 134 and downlink parameters engine 136 work with the diagnostics engine 132 to determine if the TDD parameters need adjusting. Current TDD parameters may be stored in the data store 140 and displayed on network display device 142.

Figure 2:
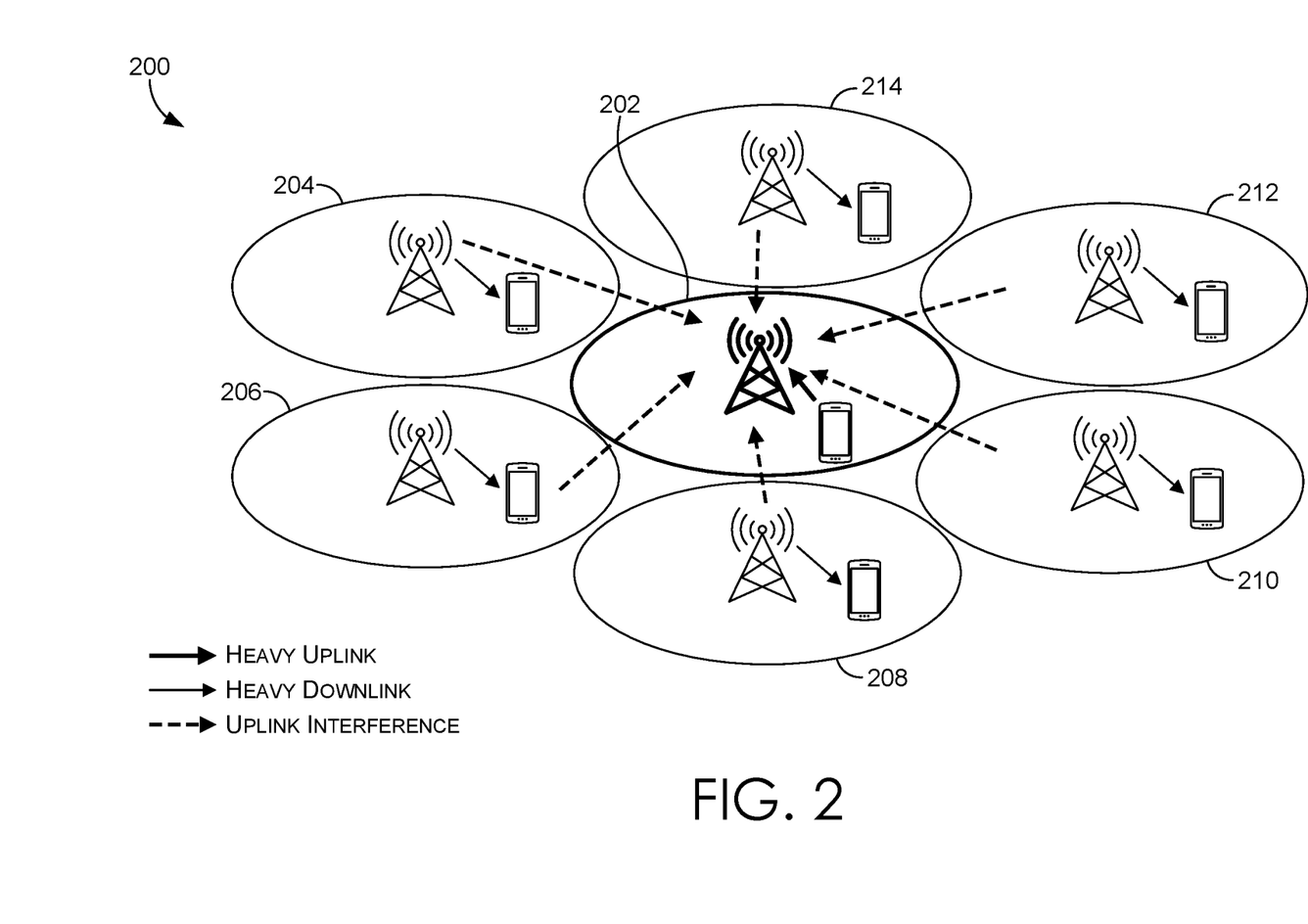
FIG. 2 depicts a wireless network environment incorporating a time division duplex (TDD) system and experiencing, in accordance with aspects herein.

FIG. 2 depicts a wireless network environment incorporating a time division duplex (TDD) system and experiencing heavy uplink TDD pattern interference. The network 200 includes high uplink traffic site 202 which is experiencing heavy uplink pattern interference from low uplink traffic sites 204, 206, 208, 210, 212, and 214. The heavy uplink pattern interference arises because TDD systems operating in the same frequency range and in the same area need to be synchronized to operate successfully and with minimal to no interference. Base stations such as high uplink traffic site 202 may need to transmit at the same time periods as low uplink traffic sites 204, 206, 208, 210, 212, and 214. Heavy uplink TDD pattern interference occurs when high uplink traffic site 202 needs to transmit more data than it receives, which may occur when multiple users served by the site are using uplink heavy applications such as video conferencing, uploading pictures or videos, and online gaming. The high uplink traffic site 202 may be using a heavy uplink TDD pattern, such as 70% downlink and 30% uplink while low uplink traffic sites 204, 206, 208, 210, 212, and 214 are using a heavy downlink pattern, such as 80% downlink and 20% uplink. The patterns given and the percentages cited are used as examples, and other patterns may be used in aspects of the present disclosure. The difference in the TDD patterns causes low uplink traffic sites 204, 206, 208, 210, 212, and 214 to interfere with high uplink traffic site 202. The arrows indicate the interference caused by the difference in TDD pattern.

Figure 3:
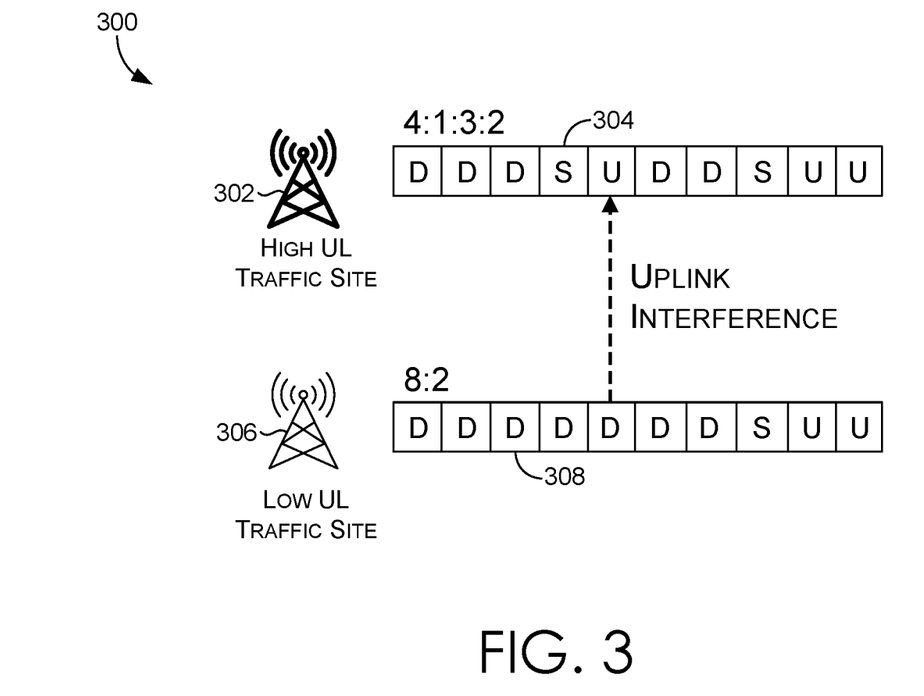
FIG. 3 illustrates an uplink time division duplex (TDD) pattern in a wireless network environment incorporating a time division duplex (TDD) system with uplink interference, in which implementations of the present disclosure may be employed, in accordance with aspects herein.

FIG. 3 illustrates an uplink TDD pattern in a wireless network environment incorporating a TDD pattern causing uplink interference. In the network 300 a high uplink traffic site 302 has a 4:1:3:2 TDD pattern 304. The pattern provides for three downlink blocks, a space, then one uplink block, followed by two downlink blocks and a space, and finally two uplink blocks. This heavy uplink TDD pattern is in conflict with the TDD pattern used by low uplink traffic site 306, which has an 8:2 TDD pattern 308. As shown in FIG. 3 uplink interference occurs when the first uplink block in TDD pattern 304 coincides with the fifth downlink block in TDD pattern 308. Aspects described below provide methods and an apparatus for solving the TDD interference issue when heavy uplink TDD is used and combined with heavy downlink TDD.

Figure 4:
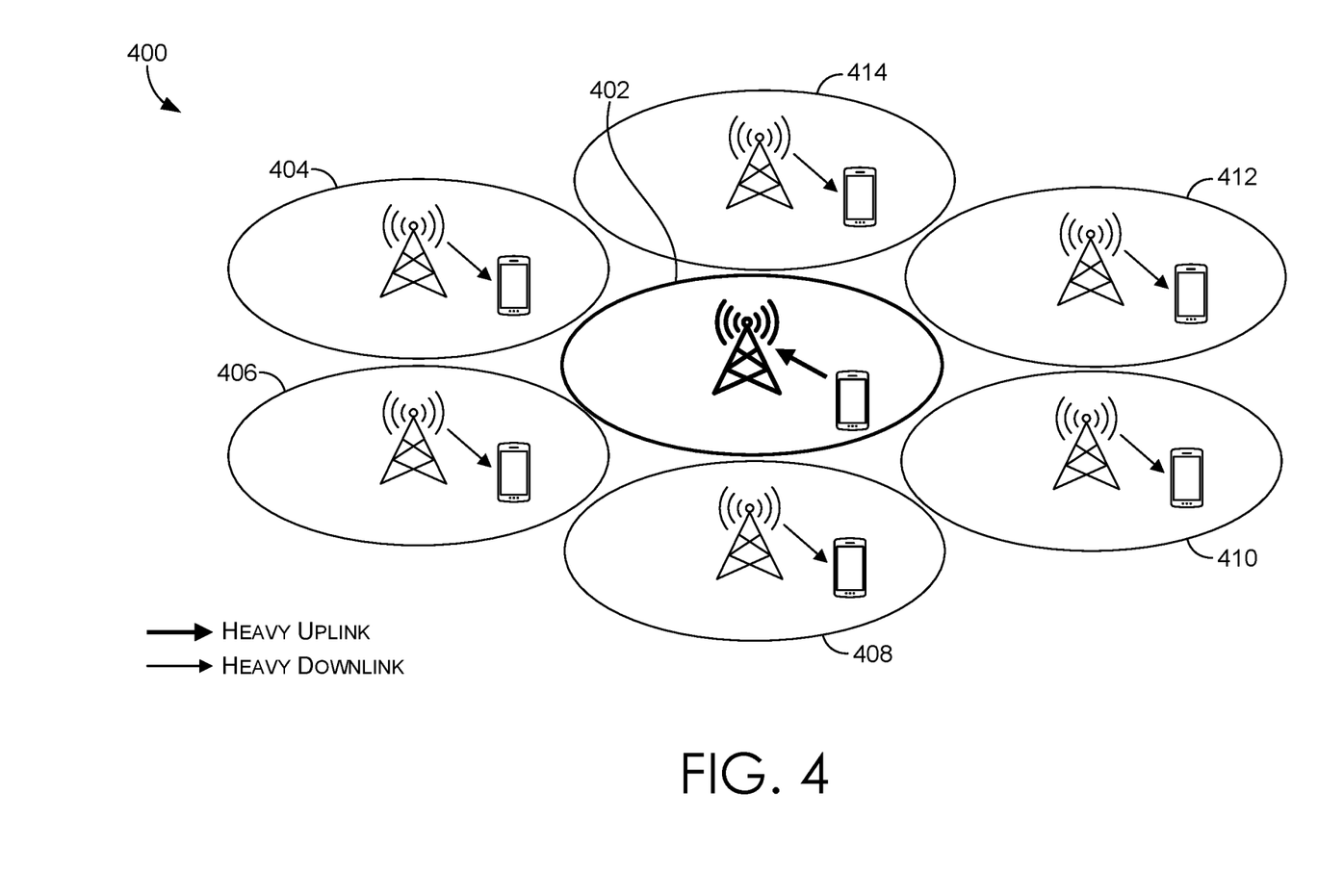
FIG. 4 illustrates a wireless network environment incorporating a time division duplex system (TDD) system with downlink blanking in accordance with aspects herein.

FIG. 4 illustrates a wireless network environment incorporating a TDD system with downlink blanking. The wireless network 400 include high uplink traffic sites 402 and low uplink traffic sites 404, 406, 408, 410, 412, 414. High uplink traffic site 402 is implementing a heavy uplink TDD pattern. Low uplink traffic sites 404, 406, 408, 410, 412, 414 are implementing a heavy downlink TDD pattern incorporating downlink blanking. As a result, there is no uplink interference to high uplink traffic site 402.

Figure 5:
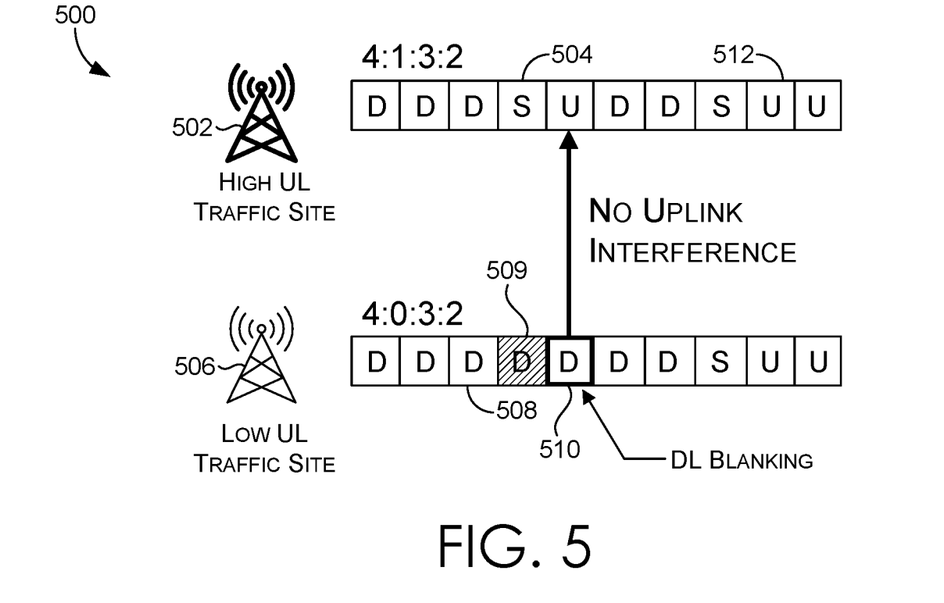
FIG. 5 illustrates an uplink time division duplex (TDD) pattern in a wireless network environment incorporating a time division duplex (TDD) system with downlink blanking, in accordance with aspects herein.

FIG. 5 illustrates a TDD pattern in a wireless network environment incorporating a TDD with downlink blanking. The wireless network 500 includes high uplink traffic site 502 that uses a heavy uplink TDD pattern 504. The heavy uplink TDD pattern 504 provides a 4:1:3:2 pattern. The pattern provides for three downlink blocks with a fourth space block, followed by one uplink block. The one uplink block is followed by two downlink blocks and a space block. The second space block is followed by two uplink blocks. To coordinate between the high uplink traffic site 502 and the low uplink traffic site 506 the low uplink traffic site 506 implements a heavy downlink traffic TDD pattern with downlink blanking 508. As illustrated in FIG. 5 the heavy downlink traffic TDD pattern provides a 4:0:3:2 pattern. The pattern provides for four downlink blocks, a zero downlink block, which acts as the first of three further downlink blocks. The fourth block of the downlink blocks is a shortened downlink block 509 that is placed before the downlink blanking slot 510. The three further downlink blocks are followed by a space block and two uplink blocks 512. The zero block coincides in time with the first uplink block of the heavy uplink TDD pattern 504. The zero or downlink blocking block provides time synchronization between the heavy uplink TDD pattern 504 and the heavy downlink TDD pattern with downlink blanking 508.

Figure 6:
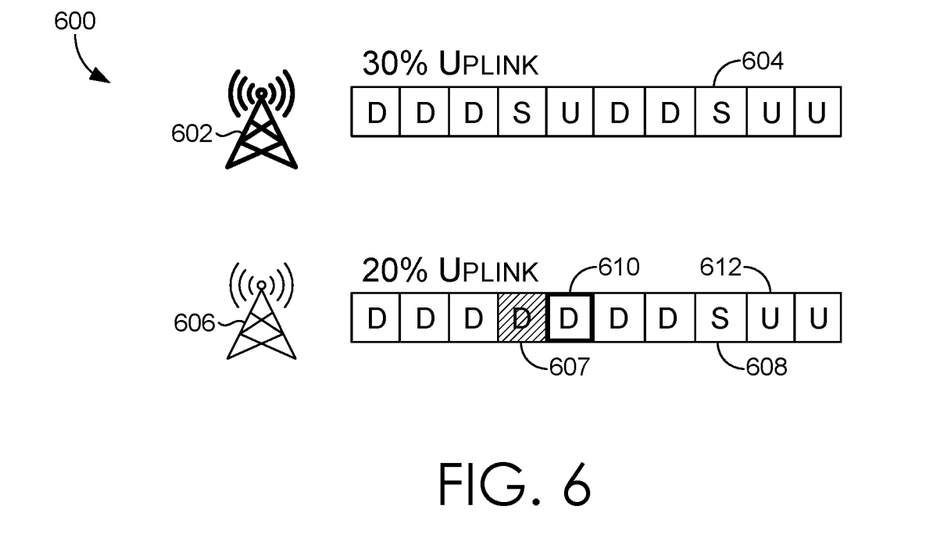
FIG. 6 illustrates frame uplink time division duplex (TDD) patterns incorporating downlink blanking, suitable for use in a wireless network environment, in accordance with aspects herein.

FIG. 6 illustrates a frame uplink TDD pattern incorporating downlink blanking, that is suitable for use in a wireless network environment. The wireless network 600 includes high uplink traffic site 602 that uses a 30% uplink TDD pattern 604. The 30% uplink TDD pattern 604 provides for three downlink blocks, a space block, one uplink block, two downlink blocks, a second space block, followed by two uplink blocks. The low uplink traffic site 606 uses a 20% uplink TDD pattern 608. The 20% uplink TDD pattern provides for four downlink blocks, followed by a zero block, which is followed by two further downlink blocks, a space block, and two uplink blocks 612. The fourth downlink blank is a shortened downlink block 607 that is placed before downlink blanking slot 610. In operation, the 30% TDD pattern 604 may provide a 42% uplink throughput improvement, when compared with low uplink TDD patterns using only 20% uplink.

Figure 7:
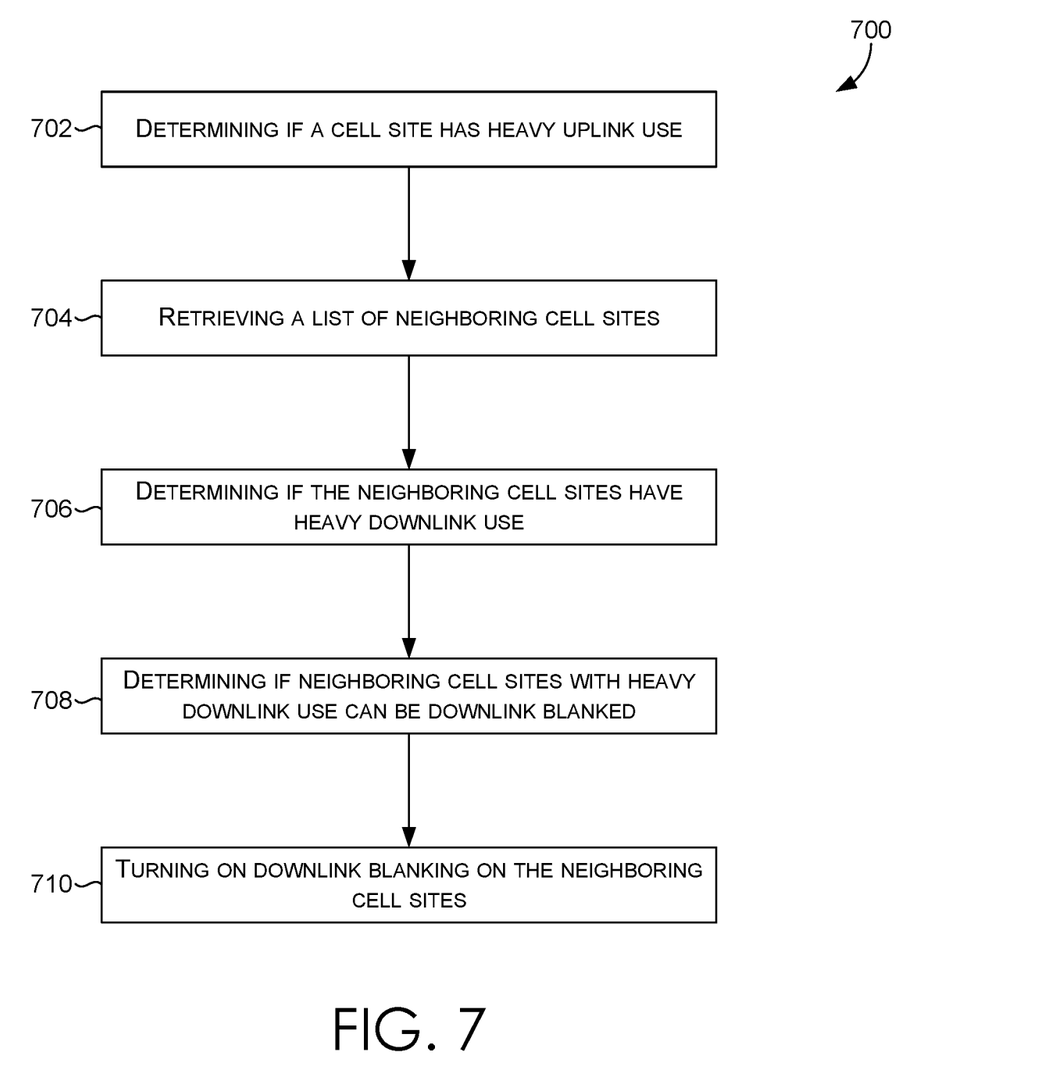
FIG. 7 depicts a flow diagram of a method for time division duplexing management suitable for use in a wireless network environment, in accordance with aspects herein.

FIG. 7 is a flow diagram of a method for time division duplexing management.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

FIG. 8 depicts a diagram of an exemplary network environment in which implementations of the present disclosure may be employed. In FIG. 8, computing device 800 includes bus 802 that directly or indirectly couples the following devices: memory 804, one or more processors 806, one or more presentation components 808, input/output (I/O) ports 812, I/O components 810, radio 816, transmitter 818, and power supply 814. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O components 810. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 804 includes computer-storage media in the form of volatile and/or nonvolatile memory. Memory 804 may be removable, nonremovable, or a combination thereof. Exemplary memory includes solid-state memory, hard drives, optical-disc drives, etc. Computing device 800 includes one or more processors 806 that read data from various entities such as bus 802, memory 804 or I/O components 810. One or more presentation components 808 present data indications to a person or other device. Exemplary one or more presentation components 808 include a display device, speaker, printing component, vibrating component, etc. I/O ports 812 allow computing device 800 to be logically coupled to other devices including I/O components 810, some of which may be built into computing device 800. Illustrative I/O components 810 include a microphone, joystick, game pad, satellite dish, scanner, printer, wireless device, etc.

The radio 816 represents one or more radios that facilitate communication with a wireless telecommunications network. While a single radio 816 is shown in FIG. 8, it is contemplated that there may be more than one radio 816 coupled to the bus 802. In aspects, the radio 816 utilizes a transmitter 818 to communicate with the wireless telecommunications network. It is expressly conceived that a computing device with more than one radio 816 could facilitate communication with the wireless telecommunications network via both the first transmitter 818 and an additional transmitters (e.g. a second transmitter). Illustrative wireless telecommunications technologies include CDMA, GPRS, TDMA, GSM, and the like. The radio 816 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for time division duplex (TDD) management, the method comprising the steps of:
   determining if a cell site has heavy uplink use, wherein the determining if the cell site has heavy uplink use is based on use of a heavy uplink TDD pattern;
   retrieving a list of neighboring cell sites;
   determining if the neighboring cell sites have heavy downlink use;
   determining if the neighboring cell sites with heavy downlink use also have low uplink use and can be downlink blanked; and
   dynamically turning on and off downlink blanking on the neighboring cell sites.

2. The method of claim 1, wherein dynamically turning downlink blanking on and off uses a self-organizing network.

3. The method of claim 1, wherein the determining if the neighboring cell sites have heavy downlink use is based on the cell site using a heavy downlink TDD pattern.

4. The method of claim 1, wherein retrieving a list of neighboring cell sites uses automatic neighbor relations.

5. The method of claim 1, further comprising turning off downlink blanking on the neighboring cell sites.

6. The method of claim 5, wherein turning off downlink blanking occurs when the cell site with heavy uplink use no longer has heavy uplink use.

7. The method of claim 6, further comprising implementing a heavy downlink TDD pattern on the cell site that had heavy uplink use.

8. A non-transitory computer-readable storage media having computer-executable instructions embodied thereon, that when executed by one or more processors, cause the one or more processors to:
   determining if a cell site has heavy uplink use, wherein the determining if the cell site has heavy uplink use is based on use of a heavy uplink TDD pattern;
   retrieving a list of neighboring cell sites;
   determining if the neighboring cell sites have heavy downlink use;
   determining if neighboring cell sites with heavy downlink use also have low uplink use and can be downlink blanked; and
   dynamically turning on and off downlink blanking on the neighboring cell sites.

9. The computer-readable storage media of claim 8, wherein dynamically turning downlink blanking on and off uses a self-organizing network.

10. The computer-readable storage media of claim 8, wherein the determining if the neighboring cell sites have heavy downlink use is based on the cell site having a heavy downlink TDD pattern.

11. The computer-readable storage media of claim 8, wherein retrieving a list of neighboring cell sites uses automatic neighbor relations.

12. The computer-readable medium of claim 8, further comprising turning off downlink blanking on the neighboring cell sites.

13. The computer-readable medium of claim 12, wherein turning off downlink blanking occurs when the cell site with heavy uplink use no longer has heavy uplink use.

14. A system for time division duplex (TDD) management, the system comprising:
   a cell site;
   multiple neighboring cell sites;
   a mobile device having heavy uplink use on the cell site;
   a network component configured to communicate with the cell site;

a processor; and
one or more computer storage hardware devices storing computer-useable instructions that, when used by the processor, cause the processor to:
 determine if the cell site has heavy uplink use, wherein the determining if the cell site has heavy uplink use is based on use of a heavy uplink TDD pattern;
 retrieve a list of neighboring cell sites;
 determine if the neighboring cell sites have heavy downlink use;
 determine if neighboring cell sites with heavy downlink use also have low uplink use and can be downlink blanked; and
 dynamically turning on and off downlink blanking on the neighboring cell sites.

15. The system of claim 14, wherein dynamically turning downlink blanking one and off uses a self-organizing network.

* * * * *